Figure 1:
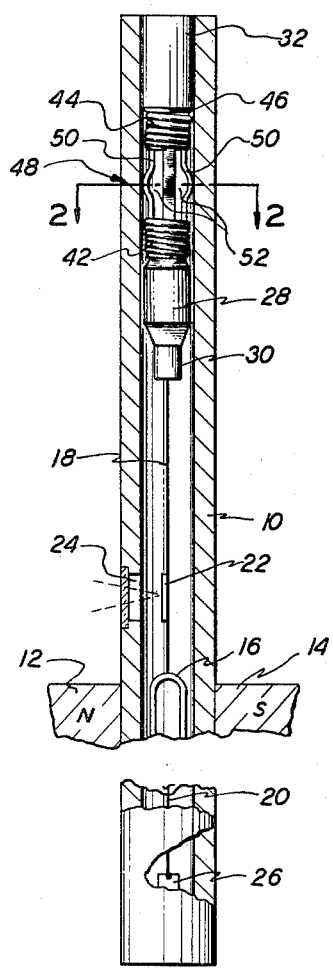

Dec. 15, 1959 D. N. MONTGOMERY ET AL 2,917,709
GALVANOMETERS
Filed Oct. 19, 1956

DONALD N. MONTGOMERY
DONALD E. LOVELACE
DAVID H. WILCOX II
INVENTORS.

BY

Christie, Parker & Hale
ATTORNEYS

United States Patent Office 2,917,709
Patented Dec. 15, 1959

2,917,709

GALVANOMETERS

Donald N. Montgomery, Glendora, Donald E. Lovelace, Arcadia, and David H. Wilcox II, Pasadena, Calif., assignors to Consolidated Electrodynamics Corporation, Pasadena, Calif., a corporation of California Application October 19, 1956, Serial No. 616,990

4 Claims. (Cl. 324—154)

This invention relates to improvements in galvanometers of the type adapted to respond to alternating or oscillating voltages, and more particularly to the type of laboratory and portable galvanometer used in oscillographs.

A typical galvanometer comprises a suspension system which extends through the interior of the body of the galvanometer. The suspension system comprises a lightweight coil which is suspended by a pair of fine wires anchored at opposite ends of the body of the galvanometer. A small mirror is affixed to the upper portion of the suspension system a short distance above the galvanometer coil so as to move in accordance with the deflection of the coil. When current flows through the coil it rotates through an angle until the torsional restoring torque of the suspension is equal and opposite to a magnetic torque caused by a pair of magnetic poles positioned in the plane of the galvanometer coils. The angular deflection of the coils is proportional to the current through the coil.

The coil suspension means in the form of conductive wire or ribbon provide electrical leads to the galvanometer coil, the upper suspension means conventionally being anchored to one terminal post sealed through an end of the galvanometer case and providing one external contact. The lower suspension means is generally anchored to a lower suspension post.

A recording oscillographic galvanometer is used to measure very small currents. It is necessary that the deflection of the coils be proportional only to the current in the coil. A deflection must not be caused by any other forces.

One disadvantage encountered in present-day galvanometers is that the suspension means is responsive to forces which are in a plane normal to the axis of the suspension. Such forces tend to develop side sway in the coil suspension system. This side sway results in a spurious deflection of the galvanometer coil causing false recordings.

The invention contemplates the use of a new galvanometer coil suspension terminal which provides a certain amount of tension upon the suspension coil but yet is substantially non-responsive to forces in a plane normal to the axis of the suspension coil. By this means we prevent side sway of the suspension means and eliminate the false recordings caused by side sway.

Briefly described, our new coil suspension terminal includes a suspension wire supporting means and a spring system having a plurality of springs. Each of the springs is resilient in response to force components acting in one direction along a plane normal to the axis of the supporting means and rigid against force components acting in another direction along this plane. The springs are arranged so that the spring system remains rigid against all force components acting in the plane.

Figure 2:
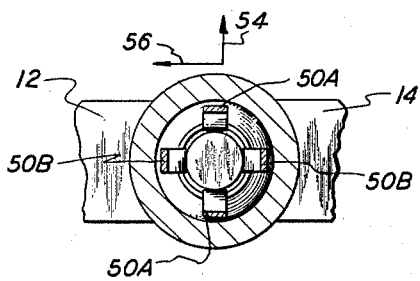

The invention will be more clearly understood with reference to the accompanying drawings, in which:

Fig. 1 is an elevation of a galvanometer of the type to which the invention is directed; and Fig. 2 is an enlarged view taken along lines 2—2 of Fig. 1.

The galvanometer shown in elevation in Fig. 1 comprises a casing 10 which may be in the form of a cylinder or any other desired shape, the length of which is many times its cross-sectional dimension.

A pair of pole pieces 12 and 14 are provided adjacent the casing 10. The pole pieces, if desired, may extend inwardly into the casing 10 to define a relatively narrow gap within the case, symmetrically arranged about the longitudinal axis thereof. Pole pieces 12 and 14 extend outwardly from the casing 10 and are adapted for engagement in a suitable magnet block (not shown).

An elongated coil 16, consisting of a large number of windings of fine wire shaped to occupy a very small cross-sectional area, is suspended in the gap between the pole pieces. The coil 16 is suspended in the gap by opposing upper and lower suspension wires 18 and 20, respectively, the suspension wires being connected to the coil termini to provide electrical leads to the coil.

A small rectangular mirror 22 is attached to the upper suspension wire in alignment with a window 24 in the side of casing 10 whereby a beam of light may be directed on the mirror and reflected back for sensing deflection of the coil 16 within the air gap between the poles 12 and 14.

The lower suspension wire 20 is bonded to a lower suspension terminal member 26.

In accordance with the invention the upper suspension wire 18 is soft soldered to a suspension post 28. The suspension post 28 includes a lower portion 30 of reduced diameter. The reduced diameter portion 30 includes a groove or slit (not shown) into which the upper suspension 18 is soft soldered.

Disposed adjacent the upper portion of casing 10 is a cylindrical terminal post 32 having an outside diameter slightly less than the inside diameter of the casing 10. If a casing is used having a shape other than cylindrical, the shape of terminal post 32 and suspension post 28 will be similar to the casing but of slightly less cross-section. The terminal post 32 is longitudinally separated from the suspension post 28.

The upper portion of suspension post 28 is tapered inwardly to permit a coil wrap 42 to be set thereon. A similar coil wrap 44 is connected to the lower tapered portion 46 of the upper terminal post 32.

The coil wraps 42 and 44 are adapted to hold firmly a plurality of spring members comprising a spring system 48. Each of the spring members is resilient in response to force components acting in one direction along a plane normal to the axis of the top suspension 18 and rigid against force components acting in another direction along this plane. The springs are so arranged that the spring system 48 remains rigid against all force components acting in the plane normal to the axis of the suspension 18.

The particular type of suspension shown consists of four flat springs 50 which have their longitudinal ends held by the coil wraps 44 and 42. These springs 50 are arranged 90° apart arcuately, and are mounted between the terminal post 32 and the suspension post 28 with their short edges facing the posts and their flat sides being substantially parallel with the sides of the casing. Each of the springs 50 has a portion thereof bent outwardly toward the casing to form a U-bend 52.

The manner in which the forces normal to the axis of the suspension are cancelled can be more clearly understood by referring to Fig. 2 which is an enlarged view taken along lines 2—2 of Fig. 1. Assume that the force components of a particular force applied in the plane normal to the axis of the suspension means can be represented by the arrows 54 and 56. The force component represented by arrow 54 will be directed along the thin side of the leaf springs 50A. Hence, leaf springs 50A will be resilient in response to force component 54. However, the force component represented by arrow 56 will be directed along the thick part of leaf springs 50A. Leaf springs 50A will be rigid against the force represented by arrow 56. Leaf springs 50B are resilient in response to the force represented by arrow 56 but rigid against the force represented by arrow 54. The net effect of the spring arrangement is that all of the forces normal to the axis of the coil suspension will have no effect upon the coil suspension. There will therefore be no side sway and the false recordings inherent in oscillographic galvanometers utilizing other types of spring suspension are eliminated.

The use of quadrature placement of the springs for exerting a tension force on the suspended element provides a terminus allowing a certain amount of spring force applied in line with the suspension but tending to be very stiff in the plane normal to the suspension.

The total deflection of the spring system with a given amount of current flowing through the coils 16, upper suspension coil 18 and lower suspension coil 20, can be controlled by several methods, such as:

(1) Changing the number of convolutions of the coil wraps 42 and 44;

(2) Changing the stiffness of the material of coil wraps 42 and 44; and (3) Changing the dimensions of the convolutions of the coil wraps.

The use of four spring segments described is a preferred embodiment. However, it is to be understood that different numbers of spring segments other than four can be used. For example, under some circumstances, it may be desirable to use only two flat springs arcuately spaced 180° with the thick side of one being transverse to the thick side of the other. This arrangement will be unresponsive to a part of the force components in the plane normal to the suspension axis.

We claim:

1. In a galvanometer having a coil suspended between magnetic poles by upper and lower suspension wires within an elongated casing, a suspension support for at least one of the wires comprising a terminal post fitted into one end of the galvanometer casing, a suspension post within the casing longitudinally separated from the terminal post and joined at one end to a suspension wire, a spring system having a plurality of flat springs longitudinally disposed within the casing between the terminal post and suspension post and arranged so that alternate springs are resilient and others are rigid to forces acting in a plane normal to the longitudinal axis of the suspension means, each spring being joined at its longitudinal ends to the terminal post and the suspension post respectively and having a portion of its flat surface bent outwardly toward the casing.

2. Apparatus in accordance with claim 1 wherein each spring is an elongate flat spring being many times greater in width than in thickness so as to be resilient in response to transverse forces acting in a first direction and rigid against forces acting in a second direction normal to the first direction.

3. Apparatus in accordance with claim 1 wherein the spring system comprises four elongate flat springs arcuately spaced 90 degrees around the peripheries of the terminal post and suspension post.

4. In a galvanometer having a coil suspended between magnetic poles by upper and lower suspension wires within an elongated casing, a suspension support for at least one of the wires comprising a terminal post fitted into one end of the galvanometer case, a suspension post within the casing longitudinally separated from the terminal post and joined at one end to a suspension wire, four elongate flat springs arcuately spaced 90 degrees within the case and joined at their respective longitudinal ends to the peripheries of the terminal post and suspension post respectively and arranged so that alternate springs are resilient and others are rigid to forces acting in a plane normal to the longitudinal axis of the suspension means, each spring having the central portion of its flat surface bent outwardly toward the casing and being many times greater in width than in thickness.

References Cited in the file of this patent

UNITED STATES PATENTS

| | | |
|---|---|---|
| 1,397,441 | Miller | Nov. 15, 1921 |
| 2,282,590 | Miller | May 12, 1942 |
| 2,425,408 | Williams | Aug. 12, 1947 |
| 2,484,823 | Hammond | Oct. 18, 1949 |
| 2,562,183 | Greibach | July 31, 1951 |
| 2,580,815 | Mooney | Jan. 1, 1952 |
| 2,693,928 | Bishop | Nov. 9, 1954 |
| 2,716,680 | Muzzey | Aug. 30, 1955 |